United States Patent
Miyamoto

(10) Patent No.: US 8,423,742 B2
(45) Date of Patent: Apr. 16, 2013

(54) DATA TRANSFER CONTROL APPARATUS AND DATA TRANSFER CONTROL METHOD

(75) Inventor: Tetsuo Miyamoto, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 357 days.

(21) Appl. No.: 12/057,533

(22) Filed: Mar. 28, 2008

(65) Prior Publication Data

US 2008/0244159 A1    Oct. 2, 2008

(30) Foreign Application Priority Data

Mar. 29, 2007    (JP) ................................ 2007-088623

(51) Int. Cl.
*G06F 12/00* (2006.01)

(52) U.S. Cl.
USPC ............. 711/167; 711/100; 711/E12.001; 711/154

(58) Field of Classification Search ............... 711/100, 711/154, 167, E12.001
See application file for complete search history.

(56) References Cited

U.S. PATENT DOCUMENTS

| | | | | |
|---|---|---|---|---|
| 3,648,247 A * | 3/1972 | Guzak, Jr. | ............. | 710/52 |
| 4,511,963 A * | 4/1985 | Kantner | ............. | 703/24 |
| 4,949,296 A * | 8/1990 | Malinowski | ............. | 708/605 |
| 5,119,444 A * | 6/1992 | Nishihara | ............. | 382/263 |
| 5,153,851 A * | 10/1992 | Kanazawa et al. | ............. | 708/654 |
| 5,771,268 A * | 6/1998 | Aoki et al. | ............. | 377/77 |
| 5,995,579 A * | 11/1999 | Vatinel | ............. | 377/69 |
| 6,611,221 B1 * | 8/2003 | Soundarapandian et al. | | 341/143 |
| 6,792,055 B1 * | 9/2004 | Hart | ............. | 375/345 |
| 7,095,906 B2 * | 8/2006 | Gu | ............. | 382/284 |
| 2001/0030649 A1 * | 10/2001 | Mamiya et al. | ............. | 345/530 |
| 2003/0018837 A1 * | 1/2003 | Hussain et al. | ............. | 710/22 |
| 2004/0135901 A1 * | 7/2004 | Aizawa et al. | ............. | 348/231.6 |
| 2007/0174371 A1 * | 7/2007 | Merlo et al. | ............. | 708/200 |

FOREIGN PATENT DOCUMENTS

| | | |
|---|---|---|
| JP | 07-334448 | 12/1995 |
| JP | 10-257297 | 9/1998 |
| JP | 11-298704 | 10/1999 |
| JP | 2001-155145 | 6/2001 |

OTHER PUBLICATIONS

Japanese Office Action issued Nov. 1, 2011 in corresponding Japanese Patent Application No. 2007-088623.

* cited by examiner

*Primary Examiner* — Mardochee Chery
(74) *Attorney, Agent, or Firm* — Staas & Halsey LLP

(57) ABSTRACT

A data transfer control apparatus includes a memory, a write control part controlling data writing to the memory, a read control part controlling data reading from the memory, a read-start calculation part calculating an output timing of a notification which indicates a read-start operation to the read control part based on each transfer condition of the data writing to the memory and the data reading from the memory, and an asynchronous transfer part asynchronously transferring a clock of the notification, and notifying the read control part of the notification.

10 Claims, 5 Drawing Sheets

FIG. 4

| STF[1:0] | ACTUAL VALUE |
|----------|--------------|
| \<center\>SET(1−(a1 × b1)/(a2 × b2))BY 2-bit REGISTER 131\</center\> | |
| 00 | 3/4 |
| 00 | 1/2 |
| 10 | 1/4 |
| 11 | 1/8 |

DATA TRANSFER CONTROL APPARATUS AND DATA TRANSFER CONTROL METHOD

CROSS-REFERENCE TO RELATED APPLICATIONS

This application claims the benefit of priority of Japanese Patent Application No. 2007-88623, filed on Mar. 29, 2007, the entire contents of which are incorporated herein by reference.

BACKGROUND

1. Field

The embodiment relates to a data transfer control apparatus and a data transfer control method.

2. Description of the Related Art

A conventional data transfer control apparatus for performing data transfer is provided between a storage apparatus and a processing apparatus. The conventional apparatus is configured to use First-In First-Out memory (FIFO memory) as a buffer. Buffering allows for differences between the transfer rates of the storage apparatus side and the processing apparatus side.

FIG. 1 illustrates a block diagram showing the configuration of the conventional data transfer control apparatus. A write control part 1101 is provided at memory side to control the writing of write data to FIFO memory 1102. The memory may be Synchronous Dynamic Random Access Memory (SDRAM). Meanwhile, a read control part 1103 is provided at the processing apparatus side (core side) to control the reading of data (read data) which were written in FIFO memory 1102. FIFO memory 1102 has a storage capacity of 64 bits×256 words for example.

As shown in FIG. 1, an asynchronous transfer part 1104 is provided between the write control part 1101 and the read control part 1103. The asynchronous transfer part 1104 receives a notification of transfer-start and a pointer of transfer-start which are input from the write control part 1101. Then the asynchronous transfer part 1104 transfers the notification of transfer-start and the pointer of transfer-start to the read control part 1103 during clock exchange.

In the configuration of FIG. 1, the core side operating frequency is 100 MHz, the amount of read data which is read at the core side per cycle is 64 bits, the memory side operating frequency is 200 MHz, and the amount of write data which is written at the memory side per cycle is 64 bits. In the above-described configuration, the read rate at the core side is 64 bits/100 MHz=800 Mbyte/sec, and the write rate at the memory side is 64 bits/200 MHz=1600 Mbyte/sec. The read rate of 800 Mbyte/sec is less than the write rate of 1600 Mbyte/sec. If the read-start is notified to the core simultaneously with the write-start by the memory side, reading operation at the core side does not overtake writing operation at the memory side. It is assumed that the writing operation at the memory side is performed without interruption.

In the conventional data transfer control apparatus of FIG. 1, the reading operation at the core side which starts before writing to FIFO memory 1102 is complete in order to improve data transfer efficiency. The reading operation at the core side overtakes the writing operation at the memory side if the read rate is greater than the write rate when the above-described transfer control is performed, depending on the timing when the reading operation at the core side starts.

For example, in the configuration of FIG. 1, the core side operating frequency is 100 MHz, the amount of read data which is read at the core side per cycle is 64 bits, the memory side operating frequency is 200 MHz, and the amount of write data which is written at the memory side per cycle is 16 bits. Thus, the read rate 800 Mbyte/sec is greater than the write rate 400 Mbyte/sec. If the read rate is greater than the write rate, the reading operation at the core side overtakes the writing operation at the memory side and valid data is corrupted when the writing operation at memory side and the reading operation at the core side are performed simultaneously. Conversely, if the reading operation at the core side starts in order to prevent the corruption of valid data after all the writing operation at the memory side is completed, time is wasted and the data transfer efficiency is reduced.

There is a problem that the reading operation overtakes the writing operation and the data transfer efficiency is reduced in the aforementioned conventional data transfer control apparatus.

SUMMARY

The embodiment provides that a data transfer control apparatus including a memory, a write control part controlling data writing to the memory, a read control part controlling data reading from the memory, a read-start calculation part calculating an output timing of a notification which indicates a read-start operation to the read control part based on each transfer condition of the data writing to the memory and the data reading from the memory, and an asynchronous transfer part asynchronously transferring a clock of the notification, and notifying the read control part of the notification.

The above-described embodiments are intended as examples, and all embodiments are not limited to including the features described above.

BRIEF DESCRIPTION OF THE DRAWINGS

FIG. 4 illustrates a total transfer size selected by a selector of FIG. 3; and

DETAILED DESCRIPTION OF THE EMBODIMENTS

Figure 1:
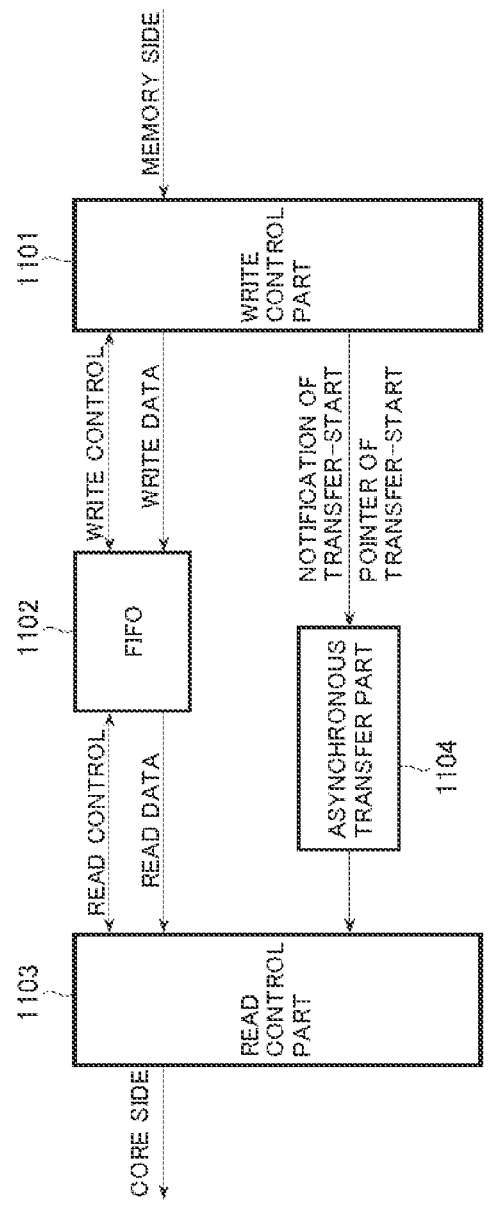
FIG. 1 illustrates a conventional data transfer control apparatus.

Reference may now be made in detail to embodiments, examples of which are illustrated in the accompanying drawings, wherein like reference numerals refer to like elements throughout.

Figure 2:
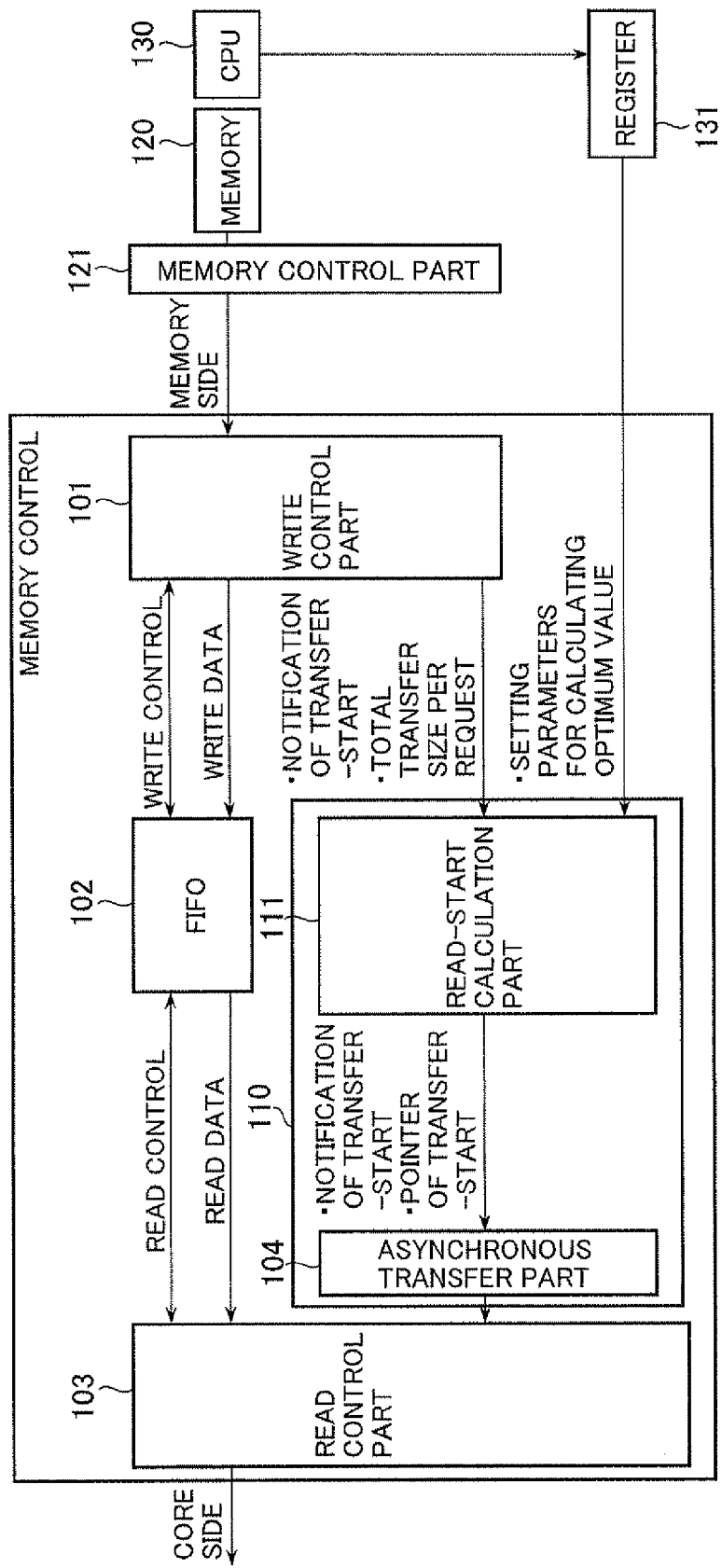
FIG. 2 illustrates a data transfer control apparatus according to one embodiment.

FIG. 2 illustrates a configuration of a data transfer control apparatus according to one embodiment. The data transfer control apparatus 100 includes a write control part 101, First-in First-out memory (FIFO memory) 102, a read control part 103, and a data transfer control part 110. The data transfer control part 110 includes an asynchronous transfer part 104 and a read-start calculation part 111.

As shown in FIG. 2, a memory 120 such as SDRAM, a memory control part 121, a CPU 130, and a register 131 are provided outside the data transfer control apparatus 100. The CPU 130 sets a setting parameter which is used for calculating the optimum value in the read-start calculation part 111.

The memory 120 is not limited to memory elements such as SDRAM, and may be a magnetic disk drive such as a hard disk.

As further shown in FIG. 2, notification of transfer-start and the total transfer size per request are output from the write control part 101. The setting parameter, which is output from the register 131, is input to the read-start calculation part 111. The read-start calculation part 111 calculates the number of cycles for notifying an optimum read-start based on the above-described inputs. The read-start calculation part 111 then outputs the notification of transfer-start and the pointer of transfer-start to the asynchronous transfer part 104 at the timing indicated by the calculation result of the read-start calculation part 111. The asynchronous transfer part 104 outputs the pointer of transfer-start to the read control part 103 at the timing indicated by the notification of transfer-start. Then the read control part 103 starts reading from FIFO memory 102 based on the read-start timing calculated by the read-start calculation part 111.

The read-start timing when the reading starts in the configuration of FIG. 2 is explained hereinafter. For example, the core side operating frequency of 100 MHz, the amount of read data which is read at the core side per cycle is 64 bits, the memory side operating frequency is 200 MHz, and the amount of write data which is written at the memory side per cycle is 16 bits, that is, the read rate 800 Mbyte/sec is greater than the write rate 400 Mbyte/sec.

If the total transfer time at the write side were less than the total transfer time at the read side (total transfer time at write side<the total transfer time at read side) in the above-mentioned configuration of FIG. 2, it is guaranteed that the reading operation at the core side will not overtake the writing operation at the memory side.

Using the above values to explain more concretely, it is guaranteed that the reading operation at the core side will not overtake the writing operation at the memory side if $1/200$ MHz×(64 bits/16 bits)×(the total transfer size−St_cycle) <$1/100$ MHz×(64 bits/64 bits)×the total transfer size, that is, St_cycle>½×the total transfer size, wherein St_cycle is a cycle count which is counted from starting the writing operation to FIFO memory 102 of FIG. 2 to notifying the read-start to the control part 103.

In the above-mentioned example, if St_cycle is greater than or equal to half of the total transfer size, the reading operation will not overtake writing operation. Therefore, if the notification of transfer-start for the reading is output from the read-start calculation part 111 of FIG. 2 to the read control part 103 when St_cycle=½×the total transfer size, the reading operation is completed in the shortest time. The asynchronous transfer part 104 notifies the read-start to the core side at the appropriate timing after the writing operation starts in the memory side.

Generalized above expression becomes following, $$1/a2 \times 1/b2 \times (\text{the total transfer size} - \text{St\_cycle}) < 1/a \times 1/b1 \times (\text{the total transfer size})$$

that is $$\text{St\_cycle} > [1-(a1 \times b1)/(a2 \times b2)] \times (\text{the total transfer size}) \quad (1)$$

Wherein a1 is core side operating frequency, a2 is the memory side operating frequency, b1 is the number of data bits written per cycle, and b2 is the number of data bits read per cycle.

As further shown in FIG. 2, the read-start calculation part 111 calculates the cycle count St_cycle at which both sides of expression (1) above become equal. The notification of transfer-start and pointer of transfer-start are output to the asynchronous transfer part 104 of FIG. 2 at the timing based on the calculation result of the read-start calculation part 111.

It is assumed that the writing operation from memory is performed without interruption in the expression (1). An appropriate parameter (for example, the number of times the memory banks of the memory 120 of FIG. 2 are changed× number of processing cycles required for one bank changing) may be added to the right side of Expression (1). If the appropriate parameter is set, the data transfer efficiency may not be reduced when the writing operation from memory is interrupted.

Figure 3:
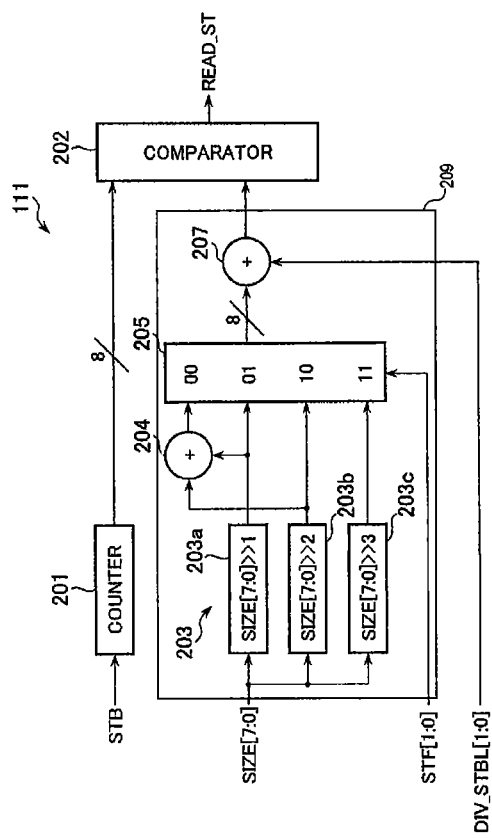
FIG. 3 illustrates an internal configuration of a read-start calculation part of FIG. 2.

FIG. 3 illustrates an internal configuration of a read-start calculation part of FIG. 2. A comparator 202 receives a Strobe (read enable) signal STB through a counter 201. The Strobe signal STB is output from the memory control part 121 of FIG. 2. For example, the counter 201 is an 8-bit binary counter and counts the length of the strobe signal STB. As a result, the counter 201 outputs the number of one-time transfer cycles.

As shown in FIG. 3, a bit shifter 203 receives the total transfer size, which is labeled as SIZE [7:0]. SIZE [7:0] indicates the 8-bit input which is output from the write control part 101 of FIG. 2. The bit shifter 203 includes bit shifters 203a, 203b and 203c, which are arranged in parallel respectively and include shift register. The bit shifter 203a outputs half the data of the total transfer size by shifting SIZE [7:0] 1 bit to right. The bit shifter 203b outputs ¼ the data of the total transfer size by shifting SIZE [7:0] 2 bits to right. The bit shifter 203c outputs ⅛ the data of the total transfer size by shifting SIZE [7:0] 3 bits to right.

As further shown in FIG. 3, the output of each bit shifter 203a, 203b and 203c of FIG. 3 is output to a selector 205. In addition, the output of the bit shifter 203a and the bit shifter 203b are added together by an adder 204, and the output of the adder 204 is output to a selector 205.

As further shown in FIG. 3, the selector 205 selectively outputs one of four data (total transfer size) based on selection signal STF [1:0], which is output from the register 131. The selection signal STF [1:0] indicates the 2-bit input. The value whose total transfer size is ((½)+(¼)), which equals ¾ as a result of the addition of the output from the bit shifter 203a and the output from the bit shifter 203b, is input to the input (00) of the selector 205. The total transfer size becomes to ½ of itself as a result of the output of bit shifter 203a is input to input (01) of the selector 205. The total transfer size becomes ¼ of itself as a result of the output from of the bit shifter 203b is input to input (10) of the selector 205. The total transfer size becomes ⅛ of itself as a result of the output from bit shifter 3 (203c) is input to input (11) of the selector 205.

The coefficient [1−(a1×b1)/(a2×b2)] on the right side of the above expression (1) is set in the register 131 of FIG. 2 as the setting parameter for calculating the optimum value. The CPU 130 of FIG. 2 sets (00), (01), (10), or (11) from the 2-bit selection signal STF [1:0] in the register 131 of FIG. 2 based on the clock frequency for reading and writing operation in the data transfer control apparatus 100 of FIG. 2.

The selector 205 of FIG. 3 thereby selects one of the four values (¾, ½, ¼, or ⅛) and outputs the selected value to the comparator 202. Each of the four values is the quotient of the SIZE [7:0] based on setting of the selection signal STF [1:0].

FIG. 4 illustrates a total transfer size selected by a selector of FIG. 3. For example: ¾ of the total transfer size is selected and output if the setting of selection signal STF [1:0] is (00). The value which is ½ the total transfer size value is selected and output if the setting of selection signal STF [1:0] is (01). ¼ of the total transfer size value is selected and output if the setting of selection signal STF [1:0] is (10). ⅛ of the total transfer size value is selected and output if the setting of selection signal STF [1:0] is (11).

The comparator 202 of FIG. 3 compares the number of one time transfer cycles counted by the counter 201 based on the length of strobe signal STB to the total transfer size. The total transfer size is calculated after being selected by the selector 205. Then, if the values in the comparator 202 match, the notification of transfer-start (READ_ST) pulse is output to the asynchronous transfer part 104 of FIG. 2. The asynchronous transfer part 104 of FIG. 2 notifies the read control part 103 of FIG. 2 of the notification of transfer-start (READ_ST) pulse based on an asynchronous clock with clock changing. Then, the read control part 103 of FIG. 2 starts the reading operation from FIFO memory 102 of FIG. 2 at the timing when the notification of transfer-start (READ_ST) pulse based on changed clock is input.

As further shown in FIG. 3, the CPU 130 of FIG. 2 sets the data transfer interruption cycle DIV_STBL [3:0] having 4-bits in the register 131. Then, the data transfer interruption cycle DIV_STBL [3:0] is added to the output from the selector 205 of FIG. 3 by the adder 207 of FIG. 3 and is output to the comparator 202 of FIG. 3. The adder 207 is connectable to the output of the selector 205 of FIG. 3. Thereby, Comparator 202 outputs the notification of transfer-start which is considered a cycles in case of data transfer interruption. The notification of transfer-start may be performed in consideration for the interruption of data transfer.

As further shown in FIG. 3, the bit shift register 203, the adder 204, the selector 205, and the adder 207 function as a conversion part 209 for outputting the transfer size which resulted when the input total transfer size SIZE [7:0] was converted by the coefficients indicated by selection signal STF [1:0] and data transfer interruption cycle DIV_STBL [3:0].

Figure 5:
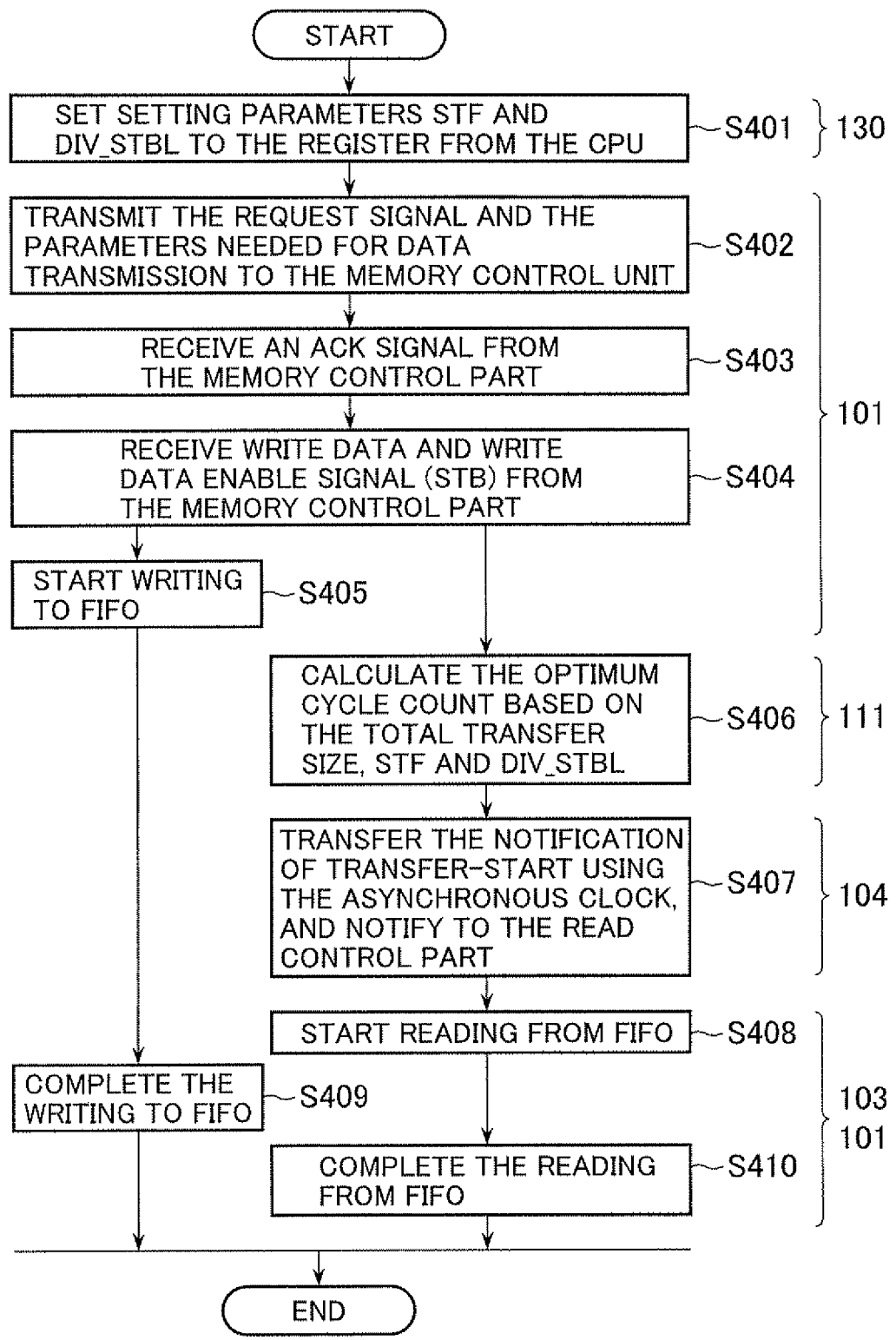
FIG. 5 illustrates a flow chart showing an operation of the data transfer control apparatus of FIG. 2.

FIG. 5 illustrates a flow chart showing an operation of the data transfer control apparatus of FIG. 2. First, the CPU 130 of FIG. 2 sets the setting parameter in the register 131 (operation S401). The setting parameter, which is the selection signal STF [1:0] and the data transfer interruption cycle DIV_STBL [3:0], is used when calculating the optimum cycle count for the notification of transfer-start using in the data transfer control apparatus 100.

As shown in FIG. 5, the write control part 101 executes operations S402 through S405. First the write control part 101 transmits the parameters (address, total transfer size, etc) which are necessary for data transfer and a write request signal to the memory control part 121 (operation S402) when the write control part 101 receives a read request from the processing apparatus side (core side). Then, the write control part 101 receives a write data and a write data enable signal (STB) from the memory control part 121 (operation S404) after receiving an ACK signal from the memory control part 121 (operation S403). The write control part 101 thereby starts writing the write data to FIFO memory 102 (operation S405).

As further shown in FIG. 5, the read-start calculation part 111 of FIG. 2 calculates the optimum cycle count of transfer-start (operation S406) after operation S404 is executed. The read-start calculation part 111 calculates the optimum cycle count of transfer-start based on the total transfer size transmitted from the write control part 101 to the memory control part 121, the selection signal STF [1:0], and the data transfer interruption cycle DIV_STBL [3:0]. This calculation is executed according to the configuration of the above-mentioned FIG. 2, for example. With the embodiment, the timing for reading from FIFO memory 102 is determined after the writing operation to FIFO memory 102. The timing for reading from FIFO memory 102 is determined based on the optimum cycle count of transfer-start which was calculated by the read-start calculation part 111.

As further shown in FIG. 5, the result of the calculation performed by the read-start calculation part 111 of FIG. 2 is output to the asynchronous transfer part 104 of FIG. 2 as the notification of transfer-start with pulse (operations S406 and S407). The asynchronous transfer part 104 notifies the read control part 103 (operation S407) of the notification of transfer-start after changing an asynchronous clock for the pulse of the notification of transfer-start. The read control part 103 starts reading from FIFO memory 102 after the notification of transfer-start is notified (operation S408).

As further shown in FIG. 5, continuous writing by the write control part 101 is completed while reading operation from FIFO memory 102 by the read control part 103 is being performed (operation S409). Then the reading operation from FIFO memory 102 by the read control part 103 is completed (operation S410). The reading operation from FIFO memory 102 may be prevented from overtaking the writing operation by the above-described sequence.

In the aforementioned embodiment, the optimum timing for the start of reading from FIFO memory was calculated according to the amount of data being written and the amount of data being read for each request. Also, in the aforementioned embodiment, the data transfer was controlled so that the reading operation may not overtake the writing operation. Any reduction in data transfer efficiency may be prevented. It may be possible to start reading data while taking into account the status of writing operation to FIFO memory. It also may be possible to shorten the completion time of reading operation from beginning to end even after reading operation has started, thereby making it possible to improve data transfer efficiency relating to reading operation.

Even if the transfer conditions in memory were changed due to memory conversion for example, it may be possible to get the optimum timing for the start of reading from FIFO memory based on the changed transfer conditions. It may be possible to allow an apparatus having a data transfer control apparatus to flexibly support specification-changes in a memory of a data processing apparatus.

The read-start calculation part 111 of FIG. 3, which is a portion of the data transfer control apparatus 100 of FIG. 2, includes hardware such as a binary counter, shift registers, adders, and a comparator. But the read-start calculation part 111 of FIG. 3 is not limited to aforementioned configuration and may include a data transfer control program (software), having the same function as the corresponding hardware, and which is executed by the CPU of FIG. 2.

The data transfer method according to one embodiment may be realized when a prepared program is executed by the CPU of a computer such as a personal computer or workstation. The aforementioned program is executed by a computer which reads the program from a recording medium such as a hard disk, a flexible disk, CD-ROM, MO, or DVD which may be read by the computer. Also, this program may exist in a transfer medium which may be distributed across a network such as the Internet.

According to the aforementioned embodiment, the read-start calculation part may increase the efficiency of data transfer without allowing reading operation to overtake writing operation by outputting the notification of transfer-start for the start of the reading operation from FIFO memory at the optimum timing based on the transfer conditions, even if the transfer conditions for writing data from memory to FIFO memory, the transfer conditions for writing data from FIFO memory to a processing apparatus, or the data transfer rates thereof are different.

The aforementioned embodiment has the effect of performing data writing to FIFO memory in a stable manner even if transfer conditions such as the data transfer rate between FIFO memory and memory or a processing apparatus differ, and of continuously reading data from FIFO memory efficiently, thereby increasing data transfer efficiency.

According to the aforementioned embodiments, the data transfer control apparatus and data transfer control method explained therein is particularly effective in a data transfer control apparatus and data transfer control method which uses FIFO memory when transmitting data. Being provided between a processing apparatus and memory, the aforementioned embodiments may absorb the different data transfer rates between the apparatus and memory and are therefore suitable for the processing of various types of data in data processing apparatuses, including video data processing apparatuses which process large amounts of data.

The many features and advantages of the embodiments are apparent from the detailed specification, and thus, the appended claims are intended to cover all such features and advantages of the embodiments that fall within the true spirit and scope thereof. Furthermore, since numerous modifications and changes will readily occur to those skilled in the art, it is not desired to limit the inventive embodiments to the exact construction and operation illustrated and described, and accordingly, all suitable modifications and equivalents may be resorted to, falling within the scope thereof.

Although a few preferred embodiments have been shown and described, it would be appreciated by those skilled in the art that changes may be made in these embodiments without departing from the principles and spirit of the invention, the scope of which is defined in the claims and their equivalents.

What is claimed is:

1. A data transfer control apparatus comprising:
    a memory;
    a write control part controlling data writing to the memory;
    a read control part controlling data reading from the memory;
    a read-start calculation part calculating an output timing of a notification which indicates a read-start operation to start the data reading to the read control part based on each transfer condition of the data writing to the memory and the data reading from the memory; and
    an asynchronous transfer part outputting the notification to the read control part, wherein the read-start calculation part includes a comparator to compare a number of one time transfer cycles counted by a counter and a value calculated based on a total transfer size notified from the write control part and to output the notification based on a comparison result,
    wherein the value is obtained by selecting a shifter from a plurality of shifters based on a selection signal and shifting binary data corresponding to the total transfer size by a selected shifter.

2. The data transfer control apparatus according to claim 1, wherein
    the counter counts the number of one time transfer cycles based on a length of a strobe signal output from a memory control part, and
    the comparator outputs the notification at the timing when the comparison result indicates matching.

3. The data transfer control apparatus according to claim 2, wherein
    the read-start calculation part includes,
    a conversion part calculates the value from the total transfer size notified from the write control part based on an operating frequency and a coefficient indicating a number of bits transferred per cycle in a processing apparatus side and a second memory which is different from the memory.

4. The data transfer control apparatus according to claim 3, wherein data transfer interruption cycles are included in the second memory as the coefficient.

5. The data transfer control apparatus according to claim 3, wherein the coefficient is preset in an external register based on transfer conditions of the processing apparatus side and the second memory.

6. The data transfer control apparatus according to claim 1, wherein a second value to be input to the comparator as the value is obtained by adding a data transfer interruption cycle to the value by an adder.

7. A data transfer control method comprising:
    calculating an output timing of a notification which indicates the start of a reading from a memory based on each transfer condition of a writing to the memory in a second memory which is different from the memory and a reading from the memory in a processing apparatus side;
    obtaining the value by selecting a shifter from a plurality of shifters based on a selection signal and shifting binary data corresponding to a total transfer size by a selected shifter;
    comparing a number of one time transfer cycles counted by a counter and the value;
    outputting the notification based on a comparison result; and
    notifying the notification.

8. The data transfer control method according to claim 7, wherein
    the number of one time transfer cycles is counted based on a length of a strobe signal from a memory control part; and
    the notification is output at the timing when the comparison result indicates matching.

9. The data transfer control method according to claim 8, further comprising,
    calculating the value from a total transfer size based on an operating frequency and a coefficient indicating a number of bits transferred per cycle in the processing apparatus side and the second memory.

10. The data transfer control method according to claim 9, wherein
    the coefficient comprises data transfer interruption cycles in the memory.

* * * * *